United States Patent
Leung et al.

(10) Patent No.: US 7,340,634 B2
(45) Date of Patent: Mar. 4, 2008

(54) REAL TIME CLOCK ARCHITECTURE AND/OR METHOD FOR A SYSTEM ON A CHIP (SOC) APPLICATION

(75) Inventors: Ho-Ming Leung, Cupertino, CA (US); Remi C. Lenoir, Menlo Park, CA (US); Zoltan Toth, Sunnyvale, CA (US); Daniel S. Perrin, Fresno, CA (US); Eric Hung, San Jose, CA (US); Timothy J. Wilson, Oldham (GB)

(73) Assignee: LSI Logic Corporation, Milpitas, CA (US)

( * ) Notice: Subject to any disclaimer, the term of this patent is extended or adjusted under 35 U.S.C. 154(b) by 367 days.

(21) Appl. No.: 10/929,011

(22) Filed: Aug. 27, 2004

(65) Prior Publication Data

US 2006/0047991 A1    Mar. 2, 2006

(51) Int. Cl.
*G06F 1/04* (2006.01)
(52) U.S. Cl. .............. 713/502; 713/500; 713/600; 365/229
(58) Field of Classification Search ........... 713/300, 713/320, 324, 500, 501, 502, 600; 365/229
See application file for complete search history.

(56) References Cited

U.S. PATENT DOCUMENTS

| | | | |
|---|---|---|---|
| 5,352,968 A * | 10/1994 | Reni et al. ............... 320/136 |
| 6,016,045 A | 1/2000 | Thomas et al. ........... 320/107 |
| 6,085,331 A | 7/2000 | Yeh et al. .................. 713/400 |
| 6,219,564 B1 * | 4/2001 | Grayson et al. ........... 455/574 |
| 6,339,369 B1 * | 1/2002 | Paranjpe .................... 340/436 |
| 6,381,701 B1 | 4/2002 | Takai .......................... 713/400 |
| 6,392,961 B1 | 5/2002 | Chiam et al. ................ 368/47 |
| 6,404,174 B1 * | 6/2002 | Boudreaux et al. ........ 323/273 |
| 6,580,219 B1 * | 6/2003 | Jones et al. .................. 315/80 |
| 6,603,365 B1 | 8/2003 | Dotzler et al. ............... 331/74 |
| 7,062,668 B2 * | 6/2006 | Kwahk et al. ............. 713/330 |
| 2004/0015732 A1 * | 1/2004 | El-Kik et al. .............. 713/300 |
| 2004/0179320 A1 * | 9/2004 | Zee ............................. 361/143 |
| 2004/0233745 A1 * | 11/2004 | Ohlhoff ....................... 365/202 |

\* cited by examiner

*Primary Examiner*—Chun Cao
*Assistant Examiner*—Malcolm D Cribbs
(74) *Attorney, Agent, or Firm*—Christopher P. Maiora P.C.

(57) ABSTRACT

An apparatus comprising a first portion, a second portion and a processor. The first portion is configured to generate a count signal in response to a number of oscillations of a clock signal. The first portion is powered by an unswitched power source. The second portion is configured to generate an interrupt signal in response to the count signal and a predetermined stored value. The second portion is powered by a switched power source. The processor is configured to (i) receive the interrupt signal and (ii) generate the switched power.

19 Claims, 4 Drawing Sheets

US 7,340,634 B2

REAL TIME CLOCK ARCHITECTURE AND/OR METHOD FOR A SYSTEM ON A CHIP (SOC) APPLICATION

FIELD OF THE INVENTION

The present invention relates to clock generation generally and, more particularly, to a real time clock architecture and/or method for a system on a chip (SOC) application.

BACKGROUND OF THE INVENTION

Conventional system on a chip (SOC) designs need a real time clock. For example, a DVD recorder (or other recorder) needs to know when to wake up from a sleep mode to record a particular event, such as a TV program. The clock needs to keep the time even when the recorder is unplugged from the power supply. In particular, a quality recorder should not be blinking at "12:00" when the power supply is restored.

Conventional solutions use an external discrete real time clock (RTC) chip to hold time. Such chips normally use bipolar technology so that they are able to run on a button battery or other low voltage inexpensive battery. External discrete real time clock chips increase the overall cost of a design.

Other solutions integrate the clock onto the SOC chip. However, a SOC is not ideal for extremely low power applications (i.e., being powered by a button battery). A typical integrated clock needs to run on a re-chargeable battery only. Rechargeable batteries are expensive. Another approach is to integrate a clock into the SOC chip with special process. Such special processes are expensive and not practical on sub-micron technology.

It would be desirable to implement an inexpensive real time clock that minimized power usage.

SUMMARY OF THE INVENTION

The present invention concerns an apparatus comprising a first portion, a second portion and a processor. The first portion is configured to generate a count signal in response to a number of oscillations of a clock signal. The first portion is powered by an unswitched power source. The second portion is configured to generate an interrupt signal in response to the count signal and a predetermined stored value. The second portion is powered by a switched power source. The processor is configured to (i) receive the interrupt signal and (ii) generate the switched power.

The objects, features and advantages of the present invention include providing a clock generation system that may (i) be implemented in a system on a chip (SOC), (ii) consume a limited amount of power, (iii) be implemented without special VLSI processes (e.g., using normal sub-micron process), (iv) work with a large variety of battery voltages (e.g., 1.2 volts to 3.3 volts), (v) work with a standard lithium watch battery, a rechargeable battery, a super capacitor, etc., (vi) provide an automatic low battery detection, (vii) provide flexibility by implementing features in software, (viii) be implemented with low cost without an external real time clock (RTC) chip, (ix) be fabricated with standard VLSI process, and/or (x) provide long battery life (e.g., >10 years) on a standard watch battery.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
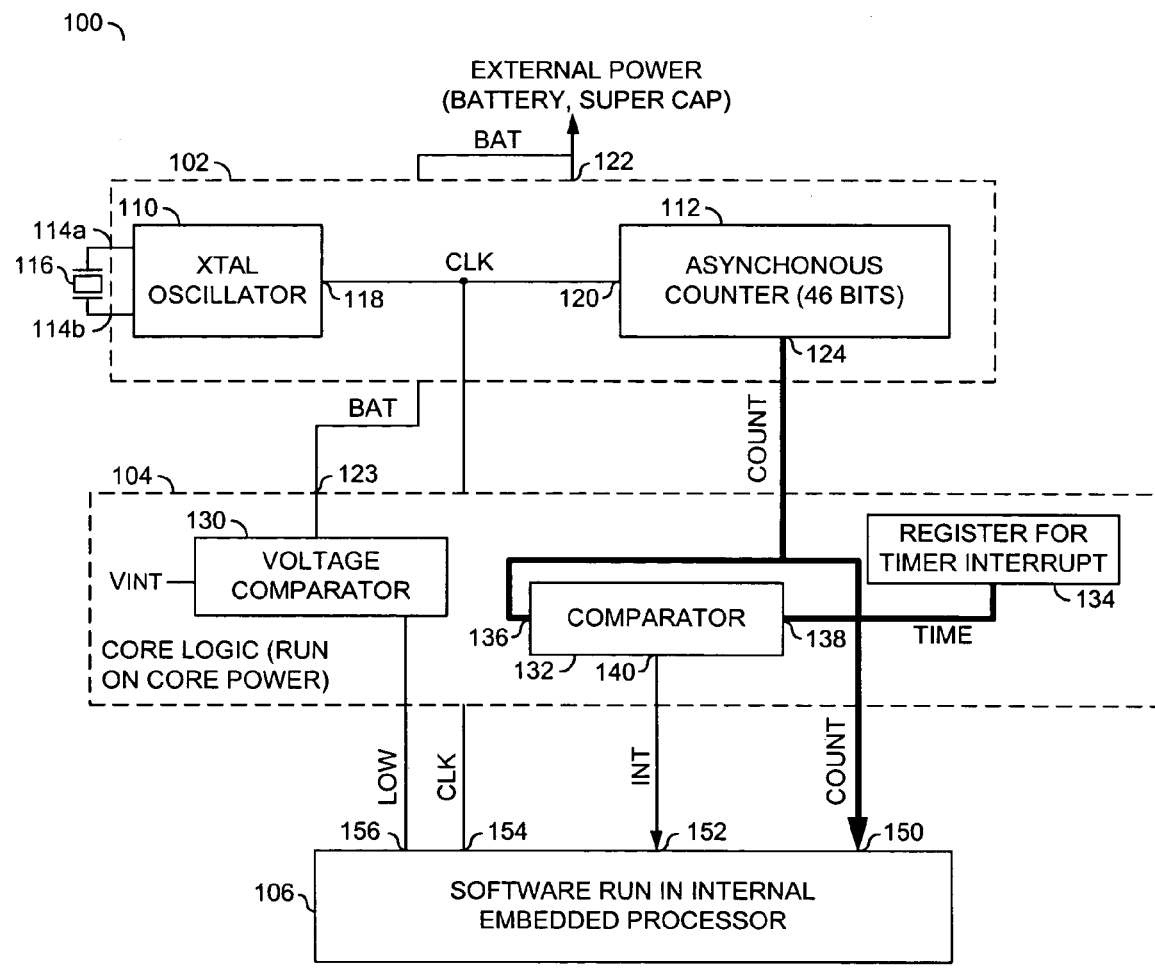
FIG. 1 is a block diagram of the present invention.

Referring to FIG. 1, a block diagram of a system 100 is shown in accordance with a preferred embodiment of the present invention. The system 100 generally comprises an external portion 102, an internal portion 104 and a software module/processor 106. The external portion 102 generally comprises a crystal oscillator 110 and a counter 112. The oscillator 110 may have an input 114a and in input 144b that are connected to a crystal 116. The oscillator 110 may have an output 118 that presents a signal (e.g., CLK) to an input 120 of the counter 112. The signal CLK may be a square wave that oscillates at a particular frequency in response to a frequency of the crystal 116. In one example, an inexpensive watch crystal may be used to implement the crystal 116. Such a crystal is typically run at 32,768 Hz. However, other frequencies may be used to meet the design criteria of a particular implementation.

The counter 112 may be implemented as an asynchronous counter to avoid the need to implement clocking circuitry. An asynchronous counter normally uses less power than a synchronous counter. In one example, the counter 112 may be implemented as a 46-bit counter. However, other counters may be implemented to meet the design criteria of a particular implementation. A 46-bit counter may be useful if the crystal 116 is a 32,768 Hz crystal (e.g., the frequency of a standard watch crystal). $32,768/2^{15}=1$ second. 1 second*$2^{31}$=2,147,483,648 seconds which equals 68 years. So a 46-bit counter driven by a 32,768 Hz crystal will count for 68 years, long beyond the useful life of a typical DVD recorder. A 45-bit counter will count for 34 years.

The internal portion 104 may be implemented as core logic (e.g., software run on a microprocessor, such as an embedded microprocessor or microcontroller). The internal portion 104 generally comprises a block (or circuit) 130, a block (or circuit) 132 and a block (or circuit) 134. The circuit 130 may be implemented as a voltage comparator circuit. The circuit 132 may be implemented as a comparator circuit. The circuit 134 may be implemented as a register. The register 134 may be configured to provide a timer interrupt signal (e.g., TIME). The signal TIME may be a multi-bit signal.

The external portion 102 may have an input 122 that receives a voltage (e.g., BAT) from an external source. The external source may be implemented as a battery, a capacitor, or other appropriate external power source. In one example, the external power may be a watch battery, rechargeable battery, super capacitor or system power. The voltage comparator 130 may receive the external source voltage BAT through an input 123. The comparator 130, the comparator 132 and the register 134 are generally powered by the same power supply that supplies the core logic in the processor 106. The counter 112 has an output 124 that presents a signal (e.g., COUNT). The signal COUNT may be a multi-bit signal. The comparator 132 has an input 136 that receives the signal COUNT and an input 138 that receives the signal TIME from the register 134. The comparator 132 compares the signal COUNT to the signal TIME to generate an interrupt signal (e.g., INT) presented through an output 140. The signal COUNT may be presented to an input 150 of the software module/processor 106. The signal INT may be presented to an input 152 of the software module/processor 106. An input 154 of the software module/processor 106 may receive the signal CLK. An input 156 of the software module/processor 106 may receive a signal (e.g., LOW) from the comparator 130.

The core logic 104 (which runs on the core power) comprises the voltage comparator 130, the comparator 132, the time register 134 and control logic/startup logic for the XTAL oscillator/counter (to be described in more detail in connection with FIG. 3).

Figure 2:
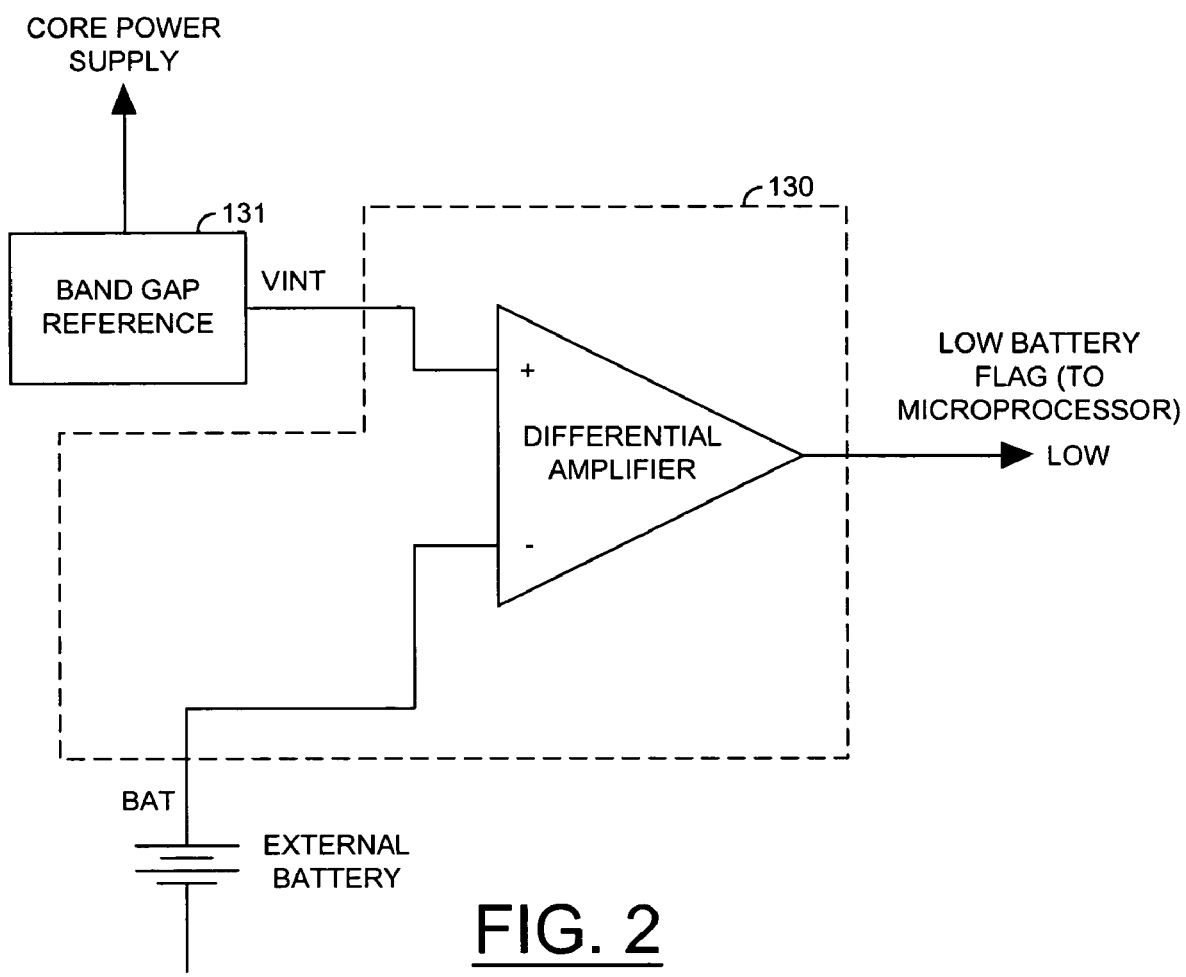
FIG. 2 is a diagram of the voltage comparator of FIG. 1.

Referring to FIG. 2, a more detailed diagram of the voltage comparator 130 is shown. The voltage comparator 130 monitors the voltage BAT of the external source or battery. If the voltage BAT drops below a certain level (e.g., 1.2 volts in one example), then the output of the comparator 130 (e.g., the signal LOW) would be asserted. The signal LOW is monitored by the microprocessor 106. A band gap reference 131 (a normal component in a DVD recorder chip) may be used to create a constant voltage signal (e.g., VINT) used to drive other analog circuits in the chip. The band gap reference voltage VINT is used as a voltage standard and compared with the battery voltage BAT to determine if the battery is performing within specifications (e.g., whether the voltage BAT is above a certain voltage level).

The crystal 116 may be implemented, in one example, as a low cost external watch crystal. However, other types of low cost crystals may be implemented to meet the design criteria of a particular implementation. While the present invention may be suitable for use with a low cost crystal, the invention will work with any crystal that is convenient. The oscillator 110 may be implemented as a low power crystal (e.g., XTAL) oscillator. The oscillator 110 and the counter 112 run on external power. In general, the external portion 102 continues to operate even if the power source that runs the main core (e.g., the core power) of the chip is removed.

Figure 3:
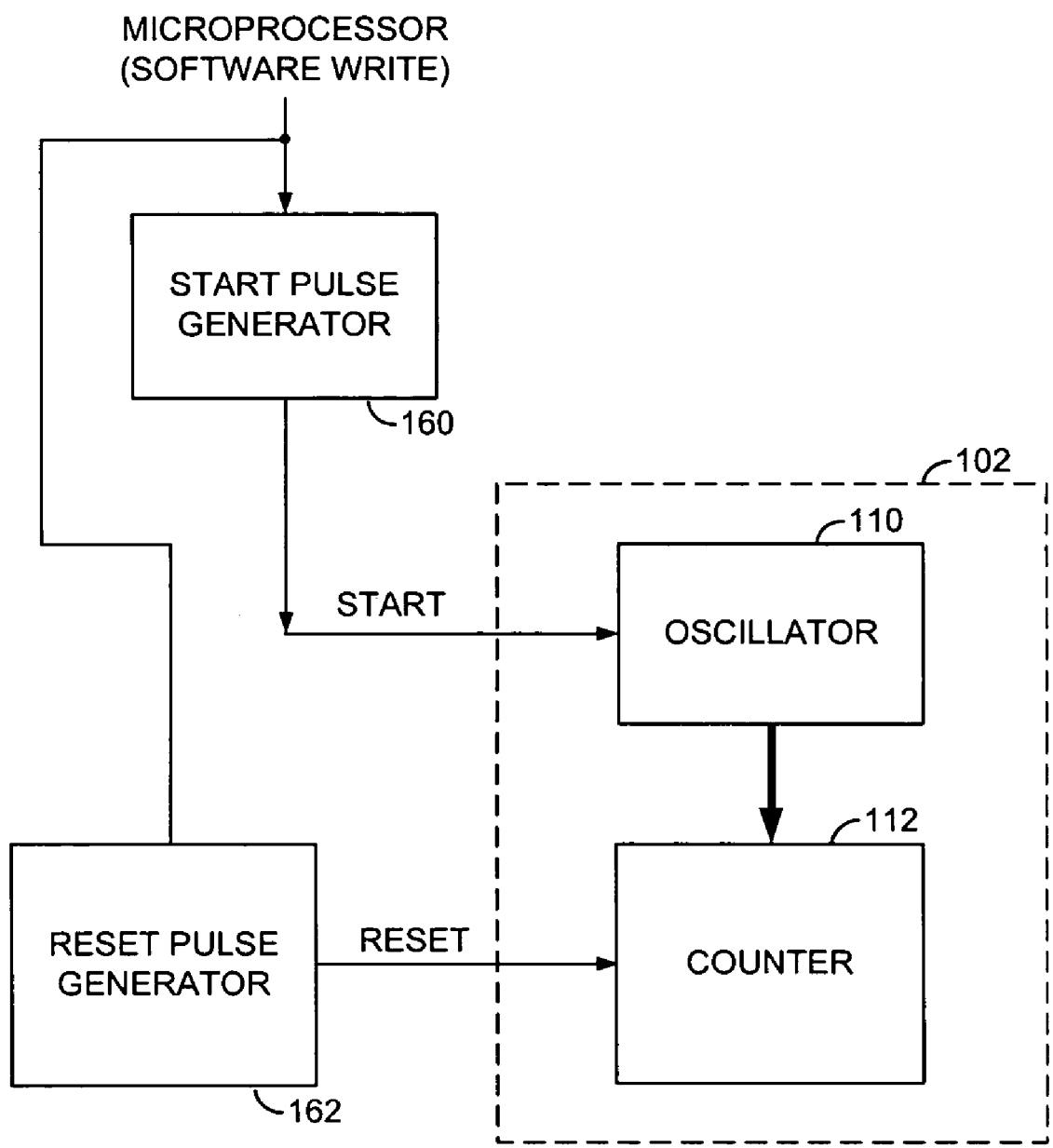
FIG. 3 is a diagram of a start up circuit.

Referring to FIG. 3, a diagram of a start up logic for the circuit 102 is shown. The oscillator 110 needs a pulse (e.g., START) to start oscillating. The counter 112 needs another pulse (e.g., RESET) for an initial start up (or after the battery is changed). The pulse START may be generated from a register 160 programmed by a microcontroller 106. The pulse RESET may be generated from a register 162 programmed by microcontroller 106. A power loss in the internal portion 104 does not affect the XTAL oscillator 110 and the counter 112. The comparator 132 generates the interrupt signal INT when the signal COUNT is equal to the predetermined value TIME. Such a feature may be useful for starting a user pre-set recording process or other real time system tasks. Software run in the internal processor 106 may be used to interpret the count into real time. Conversions such as to and/or from day light savings time may also be implemented. The interrupt signal INT may be used to wake up a recording process and/or drive the external clock display logic. The processor 106 calculates the difference between the value COUNT and the real time and stores this information in internal memory, external flash memory or external storage device (not shown). Thus, the counter 112 never needs to be set and the overall circuitry may be simplified and power consumption may be lowered.

The present invention may be implemented using standard sub-micron technology to minimize the transistors needed for implementation. The external portion 102 includes the oscillator 110 (with external clock crystal) and a single counter 112, so the transistors are kept to a minimum. Implementing the counter 112 as a 31-bit second counter may be used to count up to more than 50 years.

Figure 4:
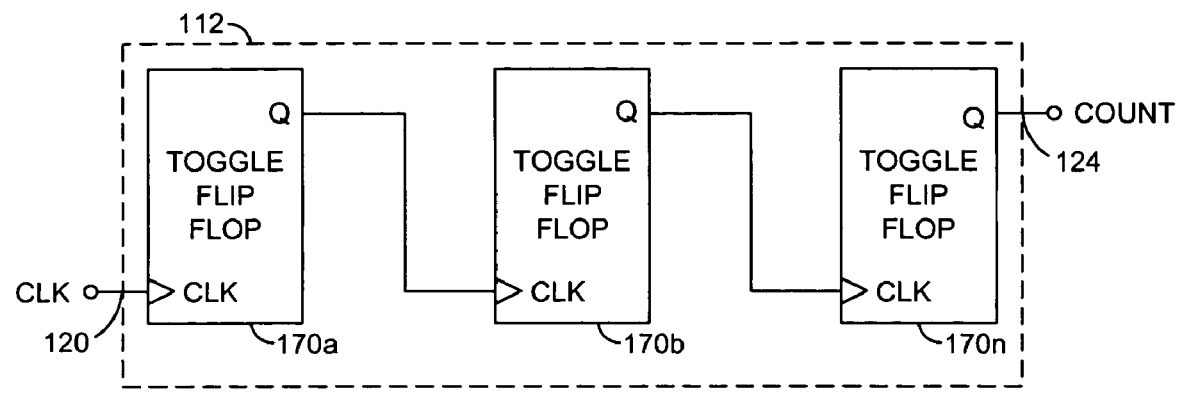
FIG. 4 is a diagram of the counter of FIG. 1.

Referring to FIG. 4 a more detailed diagram of the counter 112 is shown. The counter 112 may be implemented using a simple asynchronous toggle flip flop with a propagated carry. For example, the counter 112 may be implemented as a number of flip-flops 170a-170n. The counter 112 does not normally need to be programmed by the internal embedded microprocessor 106, which eliminates the need for synchronous logic. When a user sets the time, the processor 106 remembers the difference between the signal COUNT and the wall clock, and saves the difference in a flash memory, hard disk drive or any non-volatile memory (not shown) When the processor 106 needs to know the current time, the core logic 104 reads the counter 112 and adds the difference retrieved from non-volatile memory. The oscillator 110 and the counter 112 run on a separate battery power supply. The counter 112 may be implemented with a transistor count that is so small that a typical button battery could last for more than 10 years.

The rest of the clock generation system 100 (e.g., other than the external portion 102 and core logic 104) is not implemented by hardware, but rather is normally implemented by software run in the internal embedded processor 106. The embedded processor 106 reads the value in the counter 112, adds the retrieved difference value, and converts the value into seconds, minutes, hours, date and year. The software may also provide adjustments, such as for daylight savings time. Therefore, the real time clock has only a minimal part of logic run on the battery. The system 100 uses a partition between hardware/software to minimize the drain on the clock battery.

Figure 5:
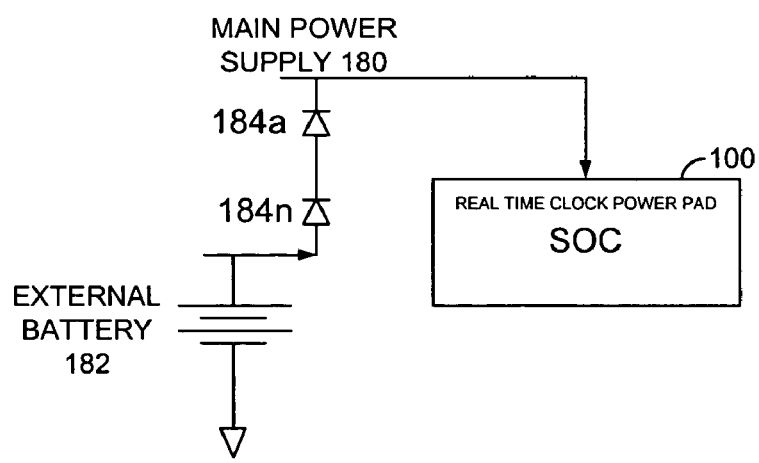
FIG. 5 is a diagram of a power supply implementation for the system of FIG. 1.

Referring to FIG. 5 a diagram of the system 100 illustrated in the context of a power supply is shown. In the system 100, a power supply 180 may be implemented to provide power to the oscillator 110 and counter 112 if the system 100 has standard power. The battery 182 would engage if the main power 180 (e.g., an internal power supply) is lost. Using the main power 180 when it is available may further extend the life of battery 182. A number of diodes 184a-184n may be implemented between the battery 182 and the power supply 180. The diodes 184a-184n may be used to control the direction of current.

The core logic 104 would compare the value in the counter 112 with some pre-set value. If the values match, the interrupt signal INT would be sent to the embedded processor 106 such that TV recording software (or other external software) could be started. The comparator 112 works on the main power, and thus would not drain the battery.

The system 100 may automatically detect a low battery condition by comparing the battery voltage with an internal band gap voltage generator. In many SOC chips, a band gap circuit is commonly implemented for other purpose. Thus, a battery low monitor is constructed with a simple voltage comparator and an existing band gap voltage generator.

The function performed by the software module 104 and a processor 106 of FIG. 1 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first portion configured to generate a count signal in response to a clock signal, wherein said first portion is powered by an unswitched power source;
    a second portion configured to generate an interrupt signal in response to said count signal and a predetermined stored value, wherein said second portion is powered by a switched power source; and
    a processor configured to receive said interrupt signal and said count signal, wherein said processor is powered by said switched power source, and wherein said first portion is further configured to automatically switch between (i) being powered by said unswitched power source when said switch power source is off and (ii) being powered by said switched power source when said switched power source is on.

2. The apparatus according to claim 1, wherein said first portion comprises hardware and said second portion comprises software.

3. The apparatus according to claim 1, wherein said first portion comprises:
    an oscillator circuit connected to a crystal; and
    a counter circuit connected to said oscillator circuit, wherein said counter circuit is configured to generate said count signal.

4. The apparatus according to claim 3, wherein said counter circuit comprises an asynchronous counter.

5. The apparatus according to claim 4, wherein said asynchronous counter comprises a multi-bit counter.

6. The apparatus according to claim 1, wherein said second portion comprises:
    a register configured to present said predetermined stored value; and
    a comparator configured to generate said interrupt signal in response to said count signal and said predetermined stored value.

7. The apparatus according to claim 1, wherein said clock signal is used to clock a system on a chip circuit.

8. The apparatus according to claim 1, wherein said apparatus further comprises
    a comparator configured to compare a voltage level of said unswitched power source with a reference voltage level to determine if said unswitched power source is running within predetermined specification.

9. The apparatus according to claim 1, wherein said unswitched power source comprises a battery.

10. The apparatus according to claim 3, wherein said counter circuit is implemented with (i) a first counter portion configured to generate a divided clock signal in response to said clock signal and (ii) a second counter portion configured to generate said count signal in response to said divided clock signal.

11. The apparatus according to claim 1, wherein said apparatus uses a difference between said count signal and a real time clock to determine a real time value.

12. The apparatus according to claim 11, wherein said real time value is used by a system on a chip circuit to initiate timed events.

13. The apparatus according to claim 11, wherein said real time clock is calculated using software.

14. An apparatus comprising:
    means for generating a count signal, wherein said count signal is generated in response to a clock signal and said means for generating said count signal is powered by an unswitched power source;
    means for generating an interrupt signal, wherein said interrupt signal is generated in response to said count signal and a predetermined stored value and said means for generating said interrupt signal is powered by a switched power source; and
    means for (i) receiving said interrupt signal and said count signal and (ii) performing a predetermined function, wherein said receiving and performing means is powered by said switched power source, and wherein said count generating means is further configured to automatically switch between (i) being powered by said unswitched power source when said switched power source is off and (ii) being powered by said switched power source when said switched power source is on.

15. A method for generating a clock signal comprising the steps of:
    (A) generating a count signal in response to a clock signal, wherein said count signal and said clock signal are generated using a first circuit powered by an unswitched power source;
    (B) generating an interrupt signal in response to said count signal and a predetermined stored value, wherein said interrupt signal is generated using a second circuit powered by a switched power source; and
    (C) presenting said interrupt signal and said count signal to a processor powered by said switched power source, wherein said first circuit is further configured to automatically switch between (ii) being powered by said unswitched power source when said switched power source is off and (ii) being powered by said switched power source when said switched power source is on.

16. The method according to claim 15, further comprising:
    receiving a current real time clock value;
    determining a difference value representing a difference between said count signal and said current real time clock value; and
    storing said difference value in a non-volatile storage medium, wherein said processor is configured to (i) read said count signal, (ii) retrieve said difference signal and (iii) generate an updated real time clock value using said count signal and said difference signal.

17. The apparatus according to claim 8, wherein said comparator is configured to generate a signal indicating whether a voltage level of said unswitched power source is low.

18. The apparatus according to claim 8, wherein said reference voltage level comprises a band gap voltage level.

19. The apparatus according to claim 1, wherein said processor is further configured to perform a predetermined function in response to receiving said interrupt signal.

* * * * *